April 5, 1949.  W. F. KANNENBERG  2,466,439
RESONANT WAVE GUIDE SWITCHING
Filed April 27, 1944  2 Sheets-Sheet 1
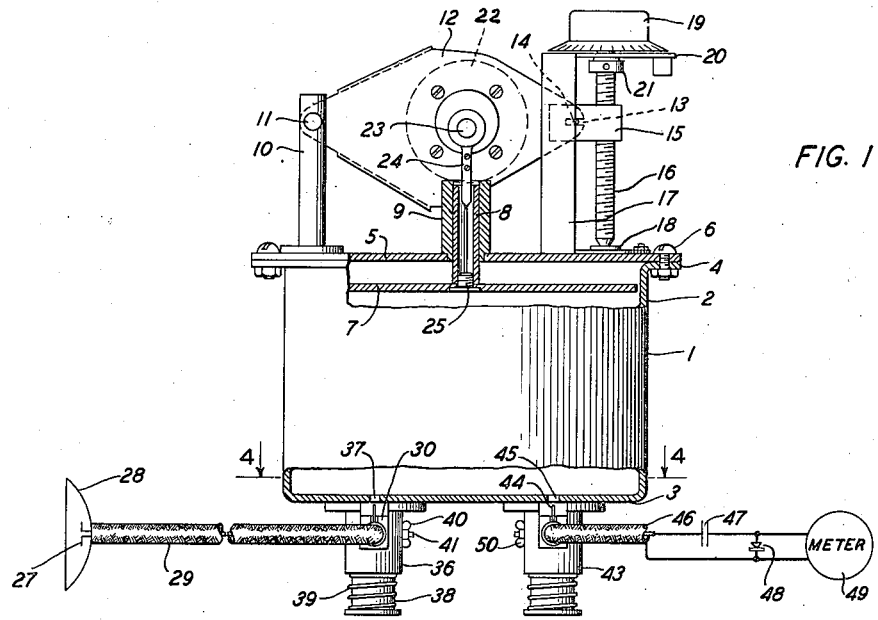
FIG. 1
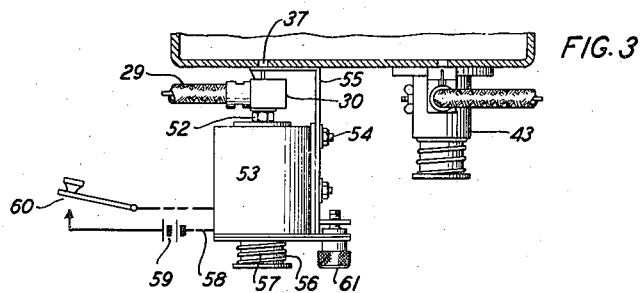
FIG. 3
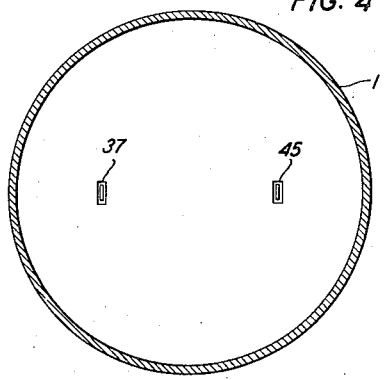
FIG. 2
FIG. 4
INVENTOR
W. F. KANNENBERG
BY
E. V. Griggs
ATTORNEY April 5, 1949.  W. F. KANNENBERG  2,466,439
RESONANT WAVE GUIDE SWITCHING Filed April 27, 1944  2 Sheets-Sheet 2

INVENTOR
W. F. KANNENBERG
BY
E. V. Griggs
ATTORNEY

Patented Apr. 5, 1949

2,466,439

UNITED STATES PATENT OFFICE 2,466,439

RESONANT WAVE GUIDE SWITCHING

Walter F. Kannenberg, Lyndhurst, N. J., assignor to Bell Telephone Laboratories, Incorporated, New York, N. Y., a corporation of New York Application April 27, 1944, Serial No. 532,979

1 Claim. (Cl. 178—44)

This invention relates to coupling devices and more particularly to retractile coupling devices for electrical resonance chambers.

An object of the invention is to provide a coupling device which may enable variation of the coupling of an external circuit to be made to the electromagnetic field within an electrical resonance chamber.

Another object of the invention is to permit variation of the tuning of an electrical resonance chamber without affecting the coupling to an external circuit.

An additional object of the invention is to permit the coupling to an electrical resonance chamber to be made ineffective at will.

A still further object of the invention is to insure that a coupling device associated with the electromagnetic field of an electrical resonance chamber may be maintained in a definite positional relationship with respect to the field.

Electrical resonance chambers are capable of wide application in the microwave field. They are only useful when capable of being coupled to an external field or circuit. In some cases it is important that the coupling employed be of such type as not reduce seriously the selectivity or effectiveness of the resonance chamber. At times it may also be desirable to vary the coupling or to render it wholly ineffective. It is frequently important that during such operations the relative position of the coupling device shall remain such that upon readjustment to its original position it shall sustain the same relation that it originally had with reference to the internal electromagnetic field of the resonance chamber.

In accordance with the invention, the coupling is attained by a small energy pick-up capable of effective energy transduction between the internal electromagnetic field and an external electrical circuit or system to which the pick-up is connected. The pick-up is small enough to be projectable through a very restricted aperture in a wall of the resonance chamber. In a simple embodiment the pick-up device may be slidably mounted to project through the aperture into the interior field or be withdrawn therefrom at will. Movement of the pick-up device may be effected by a remotely controlled device.

In the drawing, Fig. 1 illustrates a variable frequency electrical resonance chamber coupled to external input and output circuits by manually controlled retractile loops;

Fig. 2 illustrates a detail of the coupler of Fig. 1;

Fig. 3 is a modification of the coupling structure of the disclosure of Fig. 1 in which the input circuit energy pick-up device is operated by a remotely controlled solenoid;

Fig. 4 is a section of the resonance chamber in the plane 4—4 of Fig. 1 viewed in the direction of the arrows;

Figure 5:
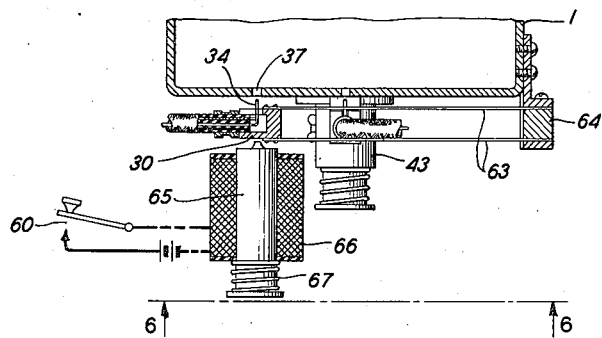
Fig. 5 is a modification of the coupling structure of Fig. 3, in which the magnetic loop is provided with a parallel spring support to insure maintenance of correct position of the loop.

Referring to Fig. 1, there is shown an energy transducing antenna with a coaxial connecting circuit leading to a hollow resonance chamber with the output circuit of which is associated a rectifying detector and meter. The hollow resonance chamber 1 comprises a cylindrical member 2 of conducting material having one end closed as at 3 and the other end provided with a flange 4 to which the cover plate 5 may be tightly clamped by bolts or screws 6. The cylindrical member 2 and the cover 5 may consist of brass, copper, spun aluminum or other metallic material having good electrically conducting properties. The interior surface of the member 2 is as smooth as possible and for the purpose of increasing its electrical conductivity is preferably coated or plated with silver. Such a closed electrical resonance chamber, as is well known, has a plurality of natural resonance frequencies depending upon its conformation and tuning.

Among the modes of oscillation of resonance chambers are two general types known respectively as transverse electric, TE and transverse magnetic, TM. For the case of cylindrical resonators the direction of wave propagation is deemed to be along the longitudinal axis of the cylinder. Transverse electric oscillations for such a resonator are those in which the electric vector lies wholly in the plane transverse, that is, perpendicular to the longitudinal axis. Transverse magnetic oscillations are those in which the magnetic vector lies wholly in a plane transverse to the longitudinal axis. In designating particular modes of transverse electric or transverse magnetic oscillations, three subscripts will be used. The first is a function of angular displacement in the plane transverse to the longitudinal axis;

the second, a function of the radial displacement from the center, and the third, a function of the length of the longitudinal axis itself. A transverse electric wave will be designated as $TE_0$ or $TE_1$, respectively, if, in traveling in an angular or circular direction in the transverse plane, no change of phase in the electric force is experienced or a full cycle of change of the electric force is experienced. A $TE_0$ wave will be designated as $TE_{01}$ or $TE_{02}$, respectively, if, in traveling radially from the center to the outer perimeter of the transverse section the electric force undergoes one or two half cycles of variation. Likewise, a transverse electric wave $TE_{01}$ will be designated as $TE_{011}$ or $TE_{012}$, if, in passing from the central point at one end of the longitudinal axis to the central point at the opposite end of the longitudinal axis the electric intensity undergoes one half cycle or two half cycles variation. When, therefore, reference is made to oscillations of $TE_{01n}$ mode oscillation, it will be understood that the electric vectors lie wholly in transverse planes; that there is no change of phase of the electric force in an angular direction about one of the transverse planes but there is a half cycle phase variation in passing from the center to the circular boundary of the transverse section and there are $n$ one half cycles variation of electric intensity in passing along the longitudinal axis from one end of the resonator to the other.

In order to vary the natural frequency of a desired mode of oscillation there may be provided a movable circular piston 7 positioned to fit loosely within the cylindrical member 2 and, like member 2, consisting of electrically conducting material with a plating of silver on its interior surface. The piston is maintained in position by a piston rod 8 of tubular form welded or soldered to the upper surface of the piston 7 and fitting closely within the tubular guide 9 which is rigidly connected, as by screw threading its end portion, to the cover plate 5. Projecting upwardly from the cover plate 5 is a vertical supporting column 10 attached to the cover plate in any desired manner and provided with a pivot 11 which serves as a supporting fulcrum for a rhomboidal mounting frame 12. At the other end of the frame 12 is a slot 13 positioned astride of a pin 14 carried by the internally threaded adjusting nut 15 with the threaded portion of which a manually operated screw 16 engages to move the nut upwardly or downwardly along the confining guide member 17. The screw 16 rests at its lower end on a bearing plate 18 on the upper surface of cover 5. At its upper end screw 16 is provided with a calibrated adjusting head 19 adjacent the supporting frame 20 which extends laterally from the upper end of guide 17. The screw passes through an aperture in the arm 20 and is held in position with respect to the arm by means of the head 19 and a collar 21 beneath the arm.

Mounted on the back of the frame 12 is an electric motor 22 having a horizontal shaft extending through the frame and carrying a crank pin 23 on which is mounted the head of a vertically reciprocating strap member 24 attached at its lower end as at 25 to the piston 7 to cause it to oscillate upwardly and downwardly in accordance with the motion of the crank pin 23. As indicated the flat strap member 24 is twisted near its center by 90 degrees to permit flexure at a point somewhat removed from the upper portion of the strap.

In order to introduce high frequency oscillations into the resonance chamber, there is provided a dipole antenna or energy pick-up 27 associated with a parabolic reflector 28 in well-known manner. Connected to the dipole 27 is a coaxial conductor 29, the inner end of which is provided with a brass terminal block 30 of the type shown in section in Fig. 2. The coaxial conductor 29 comprises an inner conductor 31, an outer conductor 32 and a surrounding covering 33 of dielectric material. The terminal block 30 is hollow to provide a chamber within which the conductors 32 and 31 may be connected to the terminals of a long thin coupling loop 34 projecting upwardly through an orifice 35 in the upper surface of the block 30. Block 30 is mounted to slide in a vertical direction within the rectangular interior guide-way of a hollow support 36 fixedly attached to the lower surface 3 of the chamber 1. Support 36 is so positioned as to bring the end of the long narrow loop 34 into substantial alignment with an elongated opening 37 in the lower end of chamber 1. The terminal block 30 is provided at its lower end with a flanged cylindrical extension 38 about which is coiled a retractile spring 39 fitting between the flange and the end of support 36 in such manner as to draw block 30 downwardly within the guiding support 36 to maintain the loop 34 withdrawn from the aperture 37. Pressure against the flanged end of extension 38 may overcome the retractile effect of spring 39 to project the tip of loop 34 through the opening 37 into the resonance chamber. While in this position the loop 34 serves effectively to couple the dipole 27 and the circuit of its coaxial conductor 29 with the internal field of the resonance chamber. If it is desired to maintain the coupling for an indefinite period, the terminal block 30 may be locked in its upward position by tightening a wing nut 40 to clamp against the exterior of the support 36. Wing nut 40 is positioned on a screw-threaded stub 41 integral with terminal block 30 and extending outwardly therefrom through a vertical slot in the side of support 36. If it be desired to uncouple the loop 34 it is merely necessary to loosen the wing nut 40 whereupon retractile spring 39 serves to withdraw the coupling loop 34 from the aperture 37.

For coupling the resonance chamber 1 to a measuring circuit, there is provided a second supporting member 43 with a loop coupling device similar in all respects to the coupling device described in connection with support 36. This second coupling device involves a loop 44 projectable through an aperture 45 at the opposite side of the lower end of chamber 1. Coupling loop 44 is connected through a coaxial conductor 46 and a stopping condenser 47 with a crystal rectifier 48 and shunting milliammeter 49 of a type well known in high frequency measuring technique. It will be apparent, therefore, that the rectifier 48 and the meter 49 may be maintained effectively connected to or disconnected from the electromagnetic field within chamber 1 irrespective of the connection to that same electromagnetic field of the circuit of dipole 27.

Apertures 37 and 45 are preferably made sufficiently small to preclude substantial transfer of energy therethrough except as the energy may be conveyed by the magnetic coupling loop. The apertures are, however, made with adequate separation to prevent excessive electrostatic coupling between the loops 34 and 44 in order to confine transfer of energy to that induced in each loop by the action of the magnetic field which it intercepts. The elongated apertures through which the loops pass are positioned at points at which the intensity of the magnetic field is relatively high. In the case of $TE_{01n}$ type oscillations for which the particular embodiment of the resonance chamber 1 illustrated in Figs. 1 and 2 was designed the apertures are preferably located at approximately .48 R from the center where R equals the radius of the interior surface of circular bottom plate 3. Moreover, the plane of each loop and, consequently, the longer direction of the aperture through which it passes is tangential to the circular electric vector of the $TE_{01n}$ mode oscillation, energy of which it is desired to transfer.

In operation the apparatus of Fig. 1 may be used as a phantom target in a test system of an object locator using electromagnetic wave echoes or it may be employed as a wave meter or tuning calibrator. When in use as a phantom target for an object locator, the locking wing nut 50 may be loosened to permit the circuit of meter 49 to be uncoupled. During the test the extension 38 may be pressed upwardly or, if desired, may be locked in position by wing nut 40 to maintain the coupling of loop 34 to the interior electromagnetic field. Under these circumstances, oscillation energy picked up in the form of pulses from the object locator transmitter is transferred through the loop 34 to the interior electromagnetic field which will build up in intensity to a magnitude determined by the intensity and duration of the object locator pulses and, also, by the degree to which the frequency of the incoming pulse oscillations correspond with a natural resonance frequency of the chamber 1. Assuming that the motor 13 is not in operation, the response of the resonance chamber 1 and the peak intensity of the field excited therein by the incoming oscillations will depend upon the position of plunger 7. It is possible by adjustment of the rotating head 19 to move the frame 12 upwardly or downwardly carrying along with it the piston 7 to a position such that the intensity of the oscillating field may be increased. Immediately upon cessation of the incoming pulse, the field which has been built up within the chamber 1 will serve as a source of outgoing oscillations which will be transmitted from the dipole 27 back to the object locator receiver to simulate a reflected pulse with substantially no time delay. As long as the oscillation within chamber 1 persists in any substantial magnitude energy will continue to be radiated from the dipole 27. This period of emission from the dipole 27 of energy stored up within the resonance chamber 1 corresponds to the time of vibration of a bell or a tuning fork and in the parlance of operators of such test apparatus is known as the "ringing time" of the resonance chamber. At the cathode-ray oscilloscope of the object locator device, the energy received from the chamber 1 via the dipole 27 provides an indication extending from substantially zero range to a range corresponding to the limit of the "ringing time." For example, if the maximum limit of the "ringing time" discernible above the noise effects be 20 microseconds it will yield a line indication extending out to the point which would be indicated in the case of reflection from an object two miles distant from the object locator.

It may transpire that it is desired to make a test of an object locator while the locator is aloft in an airplane. Under such circumstances any interference with the normal object location operation of the device must be reduced to a minimum. Under these circumstances it may become desirable to tune the resonance chamber very rapidly over the range which may be had by oscillation of the piston 7. This may be done in systematic manner by energization of the motor 13 by the operation of a remotely positioned key in circuit with the motor 13 and a suitable source of energizing current. Upon energization of the motor 13, the crank pin 23 is caused to traverse a circular course with consequent reciprocation of the supporting strap 24 and of the piston 7. The upper limiting position of the piston 7 determines the minimum resonance frequency of the chamber, the lower position its maximum resonance frequency. The range between these frequencies may be of the order of 10 megacycles and in any event should be adequate to include the transmitter frequency if the resonance chamber was properly tuned to the transmitter while on the ground. It is possible for one skilled in the interpretation of the visual pattern on the cathode ray oscilloscope to readily determine if the frequency of incoming pulse oscillations is at one extreme of the range of chamber 1 or the other or at an approximately central point. While this determination is being made and without in any way interfering with it, the operator may manipulate the cap 19 of the screw 16 to shift the resonance frequency range of resonance chamber 1 in such direction as to bring either one of the limiting frequencies or its approximately central frequency into substantial agreement with the incoming oscillations. This adjustment would ordinarily be made on the ground where the adjusting cap 19 is readily accessible to an attendant. This device may enable the central frequency of the resonance chamber to be shifted over a range of the order of 100 megacycles.

By coupling both loops 34 and 44 to the interior electromagnetic field of the chamber 1, the chamber may be used as a frequency selective device to constitute in conjunction with rectifier 48 and meter 49, a wave meter. For this purpose the adjusting head 19 of the screw 16 and the adjacent frame 20 may be calibrated in any suitable manner.

In the event that the position of the resonance chamber 1 is remote from the observer of the object locator test apparatus or the meter 49 it may become desirable to provide a remotely controlled disconnect for enabling the loop 34 to be connected to the field of the chamber 1 at will. Such a structure is shown in Fig. 3 in which the terminal block 30 is carried at the upper end of the plunger 52 of a solenoid 53 connected by bolts 54 extending from the shell of the solenoid 53 through slots in the support 55 attached to the lower end of resonance chamber 1. The solenoid plunger 52 is provided at its lower end with a cylindrical retracting head 56 and retractile spring 57 entirely analogous to the corresponding structure of Fig. 1. In series with the winding of solenoid 53 is a circuit 58 including a source 59 of electrical energy and normally open key 60. The frame of the solenoid 53 is adjustable in the direction of the resonance chamber 1 in order to enable correct normal positioning of the loop 34 with reference to aperture 37. This adjustment is effected by loosening the nuts of bolts 54 and operating the knurled head of adjusting screw 61 to bring solenoid 53 to the correct position whereupon the nuts on the bolts 54 are clamped tightly. At this position the immersion of 34 in the electric field should be such as to result in maximum ringing time.

It will be apparent that in the unenergized condition of solenoid 53, loop 34 will be effectively disconnected from the electromagnetic field of chamber 1. Upon actuation of the key 60, the solenoid will be energized to project loop 34 through the opening 37. The coupler 43 may be identical with that of Fig. 1 or, if desired, it may be provided with an independent remote control device corresponding to the solenoid 53.

Fig. 5 illustrates a modification of the structure of Fig. 3 in which the terminal block 30 is supported by a pair of flat inextensible resilient spring members 63, the outer ends of which are clamped in an obvious manner in the frame 64 attached to the lower portion of resonance chamber 1. The supporting action of the springs 63 is such that upon movement of the block 30 upwardly to project the loop 34 into the resonance chamber, the parallel positioning of the members 63 holds loop 34 constantly in a vertical position. This is a simple and effective device to prevent angular dislocation of the loop with respect to the aperture. In the case of relatively long spring supports 63, the shift of the position of loop 34 in a radial direction with respect to the mounting center at the frame 64 is insufficient to cause serious disturbance.

In this structure terminal block 30 which provides the housing for loop 34 and which is carried by the springs 63 is not attached to the plunger 65 of solenoid 66. The resilience of springs 63 and their initial bias is such as to hold the terminal block 30 with its coupling loop 34 away from the aperture 37 and in contact with the end of the plunger 65. This structure has the highly advantageous feature that commercial solenoids may be employed with mountings which do not permit precise alignments since the only function of the solenoid plunger in the structure of Fig. 5 is to exert an upward thrust against connector block 30 and the point of application of that thrust is in no way critical. As in the case of Fig. 3, upon closure of the key 60, solenoid 66 is energized to attract plunger 65 upwardly against retractile action of spring 67 thus moving the terminal block 30 upwardly to carry the loop 34 through the aperture 37 into effective magnetic coupling position with the interior electromagnetic field of resonator 1.

Figure 6:
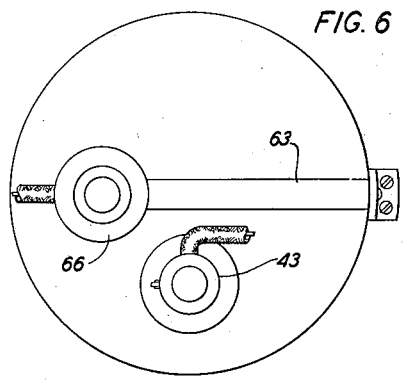
Fig. 6 is a bottom plan view of the apparatus of Fig. 5 viewed from the horizontal plane 6—6 in the direction of the arrows.

As indicated in Fig. 6 which shows a plan view of the structure of Fig. 5 looking upwardly from beneath the structure, the solenoid 66 and the coupler 43 are arranged not at diametrically opposed positions as in Figs. 3 and 4 but at radial positions separated by 90 degrees.

Figure 7:
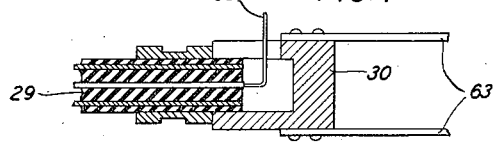
Fig. 7 illustrates in sectional detail a modification of the coupler of Fig. 5, in which for oscillations of a different mode a half dipole replaces the magnetic loop as an energy transfer device.

Fig. 7 illustrates a modification of the structure of Fig. 5 in which, in lieu of the loop coupler 34, there is employed a device of the half dipole or probe type for coupling with the electric field in the manner of an ordinary dipole antenna. As illustrated in Fig. 7, the coupling element comprises a very small rod 68 of conducting material electrically connected to the central conductor of the coaxial conductor 29. The springs 63 serve to maintain the proper positioning of terminal block 30 and of the small coupling antenna 68 with reference to the electric field within the chamber 1. Since the half dipole 68 is only effective for modes of oscillation in which there is an electric vector parallel to the half dipole, this device would not be used for $TE_{01}$ modes of oscillation but could be employed for certain other modes such as the TM modes.

What is claimed is:

In combination, an electrical resonator comprising a hollow substantially closed cylindrical chamber of high Q adapted to sustain within its interior space electromagnetic oscillations of a natural resonance frequency and the $TE_{01n}$ mode, said chamber having plane circular end walls of radius R and having its interior space between said end walls substantially free of energy absorbing material, one of said end walls having an elongated aperture located at approximately .43R from the center of the end plate and disposed with its longer dimension perpendicular to the radius, an external circuit, and a retractable switch for coupling and uncoupling said circuit to the $TE_{01n}$ mode through said aperture, said switch comprising a loop, whose plane is tangential to the field pattern of the $TE_{01n}$ mode, the dimensions of said aperture being sufficiently small to preclude substantial transfer of energy therethrough except as may be conveyed by said loop.

WALTER F. KANNENBERG.

REFERENCES CITED

The following references are of record in the file of this patent:

UNITED STATES PATENTS

| Number | Name | Date |
|---|---|---|
| 1,437,724 | Creveling | Dec. 5, 1922 |
| 2,016,604 | Karnell | Oct. 8, 1935 |
| 2,311,520 | Clifford | Feb. 16, 1943 |
| 2,342,896 | Salzberg | Feb. 29, 1944 |
| 2,378,944 | Ohl | June 26, 1945 |
| 2,417,542 | Carter | Mar. 18, 1947 |
| 2,418,839 | Julian | Apr. 15, 1947 |
| 2,427,107 | Landon | Sept. 9, 1947 |
| 2,431,941 | Kihn | Dec. 2, 1947 |
| 2,439,388 | Hansen | Apr. 13, 1948 |

FOREIGN PATENTS

| Number | Country | Date |
|---|---|---|
| 116,110 | Australia | Nov. 4, 1942 |